United States Patent [19]

Meisel

[11] 4,246,462
[45] Jan. 20, 1981

[54] MICROWAVE TUNNEL OVEN FOR THE CONTINUOUS PROCESSING OF FOOD PRODUCTS

[76] Inventor: Nicolas Meisel, Rue du Pave, 78680 Epone, France

[21] Appl. No.: 729,845

[22] Filed: Oct. 4, 1976

[30] Foreign Application Priority Data

Oct. 9, 1975 [FR] France ................................ 75 31023

[51] Int. Cl.³ .............................................. H05B 6/78
[52] U.S. Cl. ...................... 219/10.55 A; 219/10.55 R; 219/10.55 F; 219/10.55 D; 99/443 C
[58] Field of Search .................. 219/10.55 A, 10.55 R, 219/10.55 B, 10.55 M, 10.55 E, 10.55 D; 426/241, 242, 243; 99/386, 443 R, 443 C, 477; 328/230, 232

[56] References Cited

U.S. PATENT DOCUMENTS

| 2,609,497 | 9/1952 | Dawson | 328/230 |
|---|---|---|---|
| 2,722,749 | 11/1955 | Dargent | 426/241 |
| 3,402,277 | 9/1968 | Muller | 219/10.55 F |
| 3,427,171 | 2/1969 | Jeppson | 99/443 C |
| 3,461,260 | 8/1969 | Bremer | 219/10.55 F |
| 3,465,114 | 9/1969 | Bleackley et al. | 219/10.55 A |
| 3,478,188 | 11/1969 | White | 219/10.55 A |
| 3,582,598 | 6/1971 | Wincott | 219/10.55 A |
| 3,676,058 | 7/1972 | Gray | 219/10.55 R |
| 3,765,985 | 10/1973 | Siard et al. | 219/10.55 A |
| 3,843,861 | 10/1974 | Van Amsterdam | 219/10.55 A |
| 3,909,574 | 9/1975 | Muller et al. | 219/10.55 A |
| 4,005,301 | 1/1977 | Thourel | 219/10.55 A |

FOREIGN PATENT DOCUMENTS 2155633  5/1973  Fed. Rep. of Germany .... 219/10.55 F

Primary Examiner—B. A. Reynolds
Assistant Examiner—Philip H. Leung
Attorney, Agent, or Firm—Robert T. Dunn

[57] ABSTRACT

A modular microwave tunnel oven with multiple microwave sources and controlled atmosphere for the continuous processing of food products has a cruciform shaped conductive cavity of extended length through which a conveyor belt runs for carrying food products through the oven; the conveyor belt and other structure within the cavity are fabricated of non-toxic, heat resistant materials that are transparent to the microwave radiation and have inner surfaces that contact the food products that can be easily cleaned; one side of the cavity formed by one or more hinged doors opens completely along the extended length making access for changing the conveyor belt and/or cleaning the oven unobstructed; and microwave energy is launched into the cavity above and below the conveyor belt; whereby the microwave energy fields tend to be greater along the middle of the conveyor belt than along the edges thereof.

10 Claims, 8 Drawing Figures

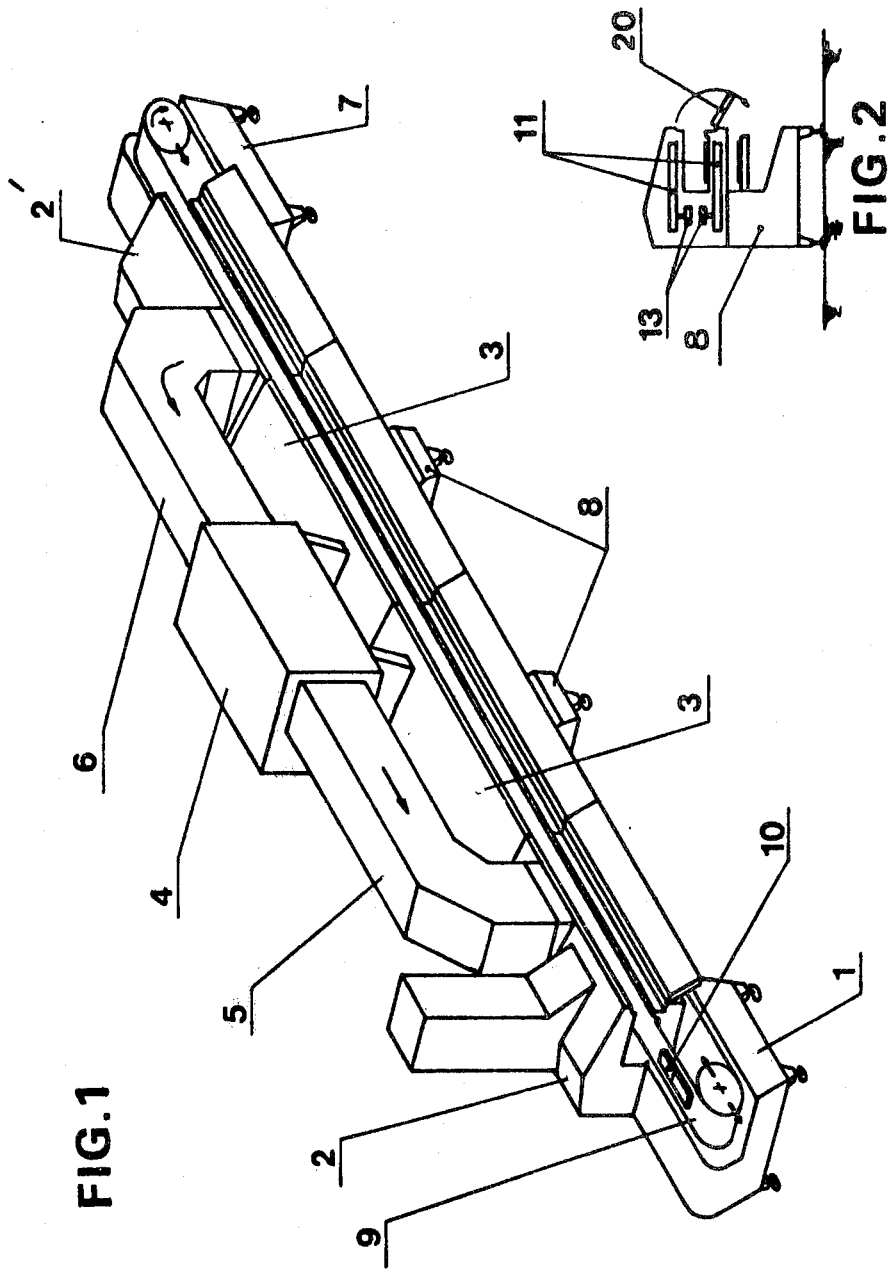

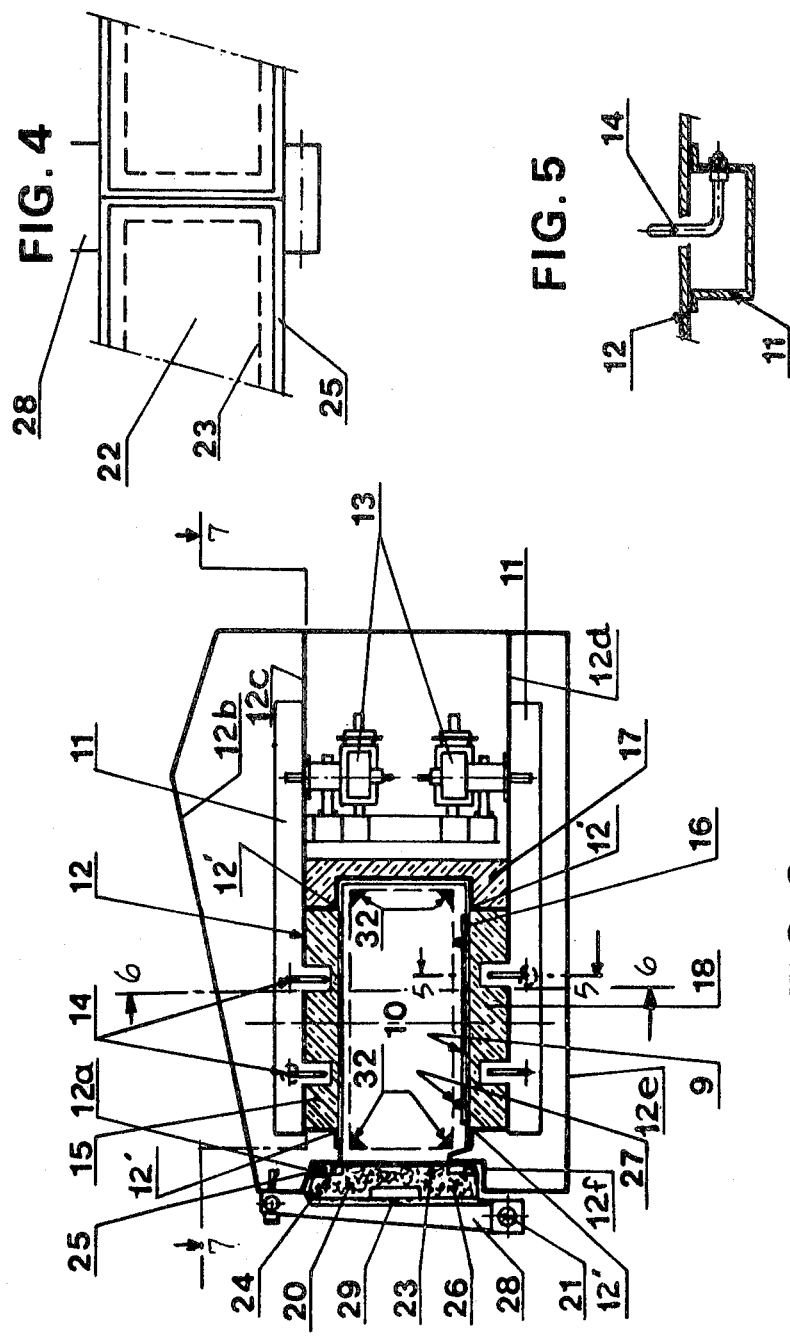

MICROWAVE TUNNEL OVEN FOR THE CONTINUOUS PROCESSING OF FOOD PRODUCTS

BACKGROUND OF THE INVENTION

The present invention relates to microwave tunnel ovens and more particularly to an improved oven for the continuous processing of food products.

Microwave tunnel ovens provide an electrically conductive oven cavity whose size is on the order of several wave lengths of the microwave energy for the processing of packaged food products. French Pat. No. 1260933, dated April 4, 1961, describes a tunnel oven designed for continuous heating. It has a noria type handling system and is U-shaped to prevent the leakage of microwave radiation through its inlet and its outlet.

German Pat. No. 1116137 describes a straight line tunnel with a rectangular cross section, equipped with a system of wave traps, located at the inlet and the outlet. Their function is to insure that the microwave radiation remains inside the apparatus. It also features the shields located at the ends to absorb any microwave radiation that by-passes the traps themselves.

U.S. Pat. No. 3,263,052 describes equipment in which microwave energy is introduced through slots longitudinally spaced on a wave guide located on the upper section of the tunnel which has a rectangular cross section. The wave guide is parallel to the longitudinal axis of the tunnel. The radiation which is introduced through the slots, has a tendency to propagate towards the ends of the tunnel. A number of deflectors, made of metallic curtains, are attached transversally on the inner top surface of the oven and they extend vertically down to the top level of the product to be processed. Also, as in the above mentioned German patent, there are devices located at each end of the tunnel for the absorption of the microwave energy not absorbed in the tunnel itself. This patent also provides for injecting or extracting gases through slots in the wave guide or, as required, to plug up those openings with non-energy absorbing material to prevent condensation of the vapors caused by the process within the wave guide.

None of the apparatus described by the above patents can be used with non-packaged food stuff. These devices are not easily cleaned and unless they are kept clean and disinfected they will not meet hygenic standards.

The uni-directional injection system of microwave energy (from the top) used in the apparatus described by the above patents has the net effect of overheating the food in the area facing the energy sources, particularly when the foodstuff form a continuous layer the length of the oven. This condition of overheating is preferable from the viewpoint of optimum use of the apparatus as well as for the uniformity of heating, however, where the load is discontinuous, the extremities of the blocks have a tendency to heat up much faster than their central portion. When the pieces touch each other, as is the case for fishsticks or blocks of meat, the load can be considered as forming a continuous layer and when the loading is accomplished in that fashion, the edges and mostly the angles have a tendency to absorb more energy.

Other problems arise when the energy injection system includes a multitude of microwave sources such as magnetrons. These exhibit certain types of technical problems related to the energy coupling between the magnetrons that can cause their destruction. Also the ovens described in the above patents have a monolithic structure which makes their handling, as well as size modification difficult.

SUMMARY OF THE INVENTION

In accordance with a principal feature of the present invention, the oven tunnel of extended length is in a microwave conductive cavity, the cross section shape and dimensions of the cavity are (width W and height H) substantially uniform along the extended length and define the cavity axis. The cross section shape is cruciform and so the intensity of fields of the microwave energy conducted by the cavity tends to be greatest in a longitudinal plane of symmetry through the axis, perpendicular to the width W and at the center of the foodstuff carried on the belt. This tends to heat the center of the foodstuff more than the edges and so overcomes one of the problems in prior systems.

Another feature which tends to overcome the problem of excessive edge heating is that microwave energy is launched into the cavity from below the conveyor belt as well as above and this is facilitated by the modular feature. The modular sections can be identical and each include several attached waveguides on the top and bottom of the modular section, each energized by a magnetron. Antenna from each waveguide launch microwave energy into the cavity at places along the cavity that are staggered on each side of the cavity axis. Hence the launch places along the top and bottom of the cavity do not directly face each other across the cavity axis.

Modular design of the cavity enables varying the input energy by removal or addition of standard modules, each including one or more microwave sources. The oven can also be used while fed cold or hot gases as supplemental sources of heating or refrigeration depending upon the industrial process. For example, hot air is added for the cooking, cold air for defrosting or inert gases can be added where surface oxidation of the product may be objectionable. To this end, and in spite of the presence of microwave radiation, the oven cavity as well as the doors are thermally insulated.

Each module, as well as the joints between modules, are completely accessible for cleaning, especially the doors on the side wall of the oven. All inside corners of the tunnel are rounded and inside surfaces are smooth and continuous. Thus, any potential bacterial source in the tunnel is easily cleaned. When the doors are open, the tunnel in the cavity has the appearance of a C from the side. Hence there is total access to the interior. As a further aid to cleaning, the oven projects cantilever from ground supports, permitting the conveyor belt and drive rollers for the belt to be easily removed.

Microwave leak integrity is achieved with doors equipped with wave traps or electrical continuity. Leaks between the adjacent doors along one side of the tunnel are eliminated through the use of special flaps where the doors abut which also provide means for easier handling of the doors themselves.

It is an object of the present invention to provide a microwave tunnel oven wherein at least some of the disadvantages of prior ovens of this type are avoided.

It is another object to provide an improved microwave tunnel oven for the continuous processing of foodstuffs.

It is another object to provide a microwave tunnel oven conprised of modular sections which are connected end to end to provide an oven of desired length and capacity.

It is another object to provide a microwave tunnel oven wherein the energy tends to be absorbed more at the center of foodstuffs conveyed through the tunnel than at the edges thereof.

It is another object to provide a microwave tunnel oven wherein there is easy access for cleaning the interior and/or removing the conveyor belt and drive rollers.

Other features, advantages and objects of this invention will become apparent from the following description of embodiments of the invention taken in conjunction with the figures.

DESCRIPTION OF THE DRAWINGS

FIG. 1 is a three quarter view showing an assembly of the microwave tunnel oven for continuous processing of foodstuffs, incorporating features of the invention;

FIG. 2 is a cross-section view of one of the oven modules taken as shown in FIG. 1;

FIG. 3 is larger detail cross-section view of the same oven module;

FIG. 4 is a view in the direction of arrow F of the juncture between adjacent module oven doors taken as shown in FIG. 3;

FIG. 5 is a cross section view AA of the waveguide and an antenna of the module taken as shown in FIG. 3;

DESCRIPTION OF EMBODIMENTS OF THE INVENTION

Figure 6:
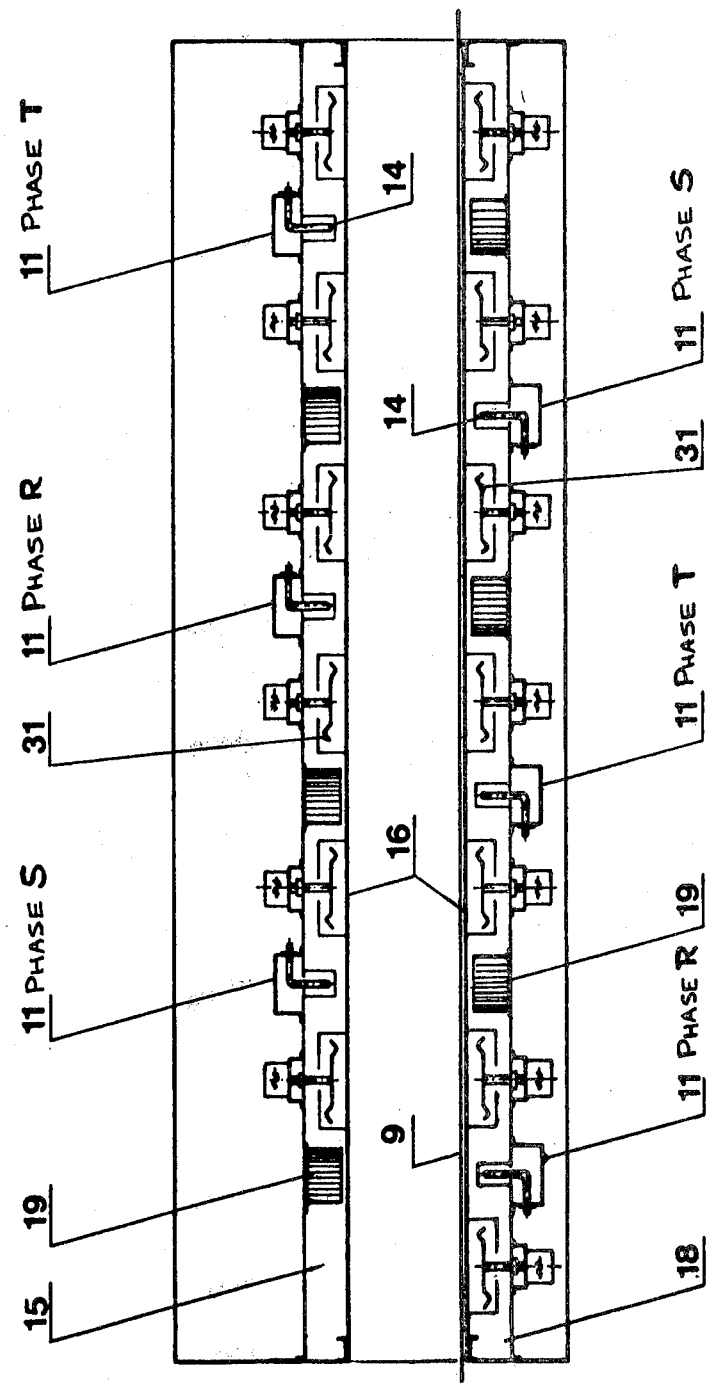
FIG. 6 is a vertical cross section view BB through the extended length of the module, taken as shown in FIGS. 3 and 7.

An embodiment incorporating all of the features of the present invention is shown by FIG. 1. It is a microwave tunnel oven for the continuous processing of foodstuff. The tunnel part of the oven is formed of several modular microwave modules. The elements of the oven include:
1. an input unit, which includes the return roller for the conveyor system.
2. entrance shield unit with wave traps.
3. one or several modular microwave modules
4, 5, 6. hot or cold gas ducts located between the microwave modules, and the entrance and exit shields.
2'. output shield similar to the input shield unit.
7. exit unit which contains the drive for the conveyor system.

Each microwave module, such as 3, is equipped with a bi-directional and sequential microwave energy injection system into the tunnel cavity of extended length and uniform cross section shown by FIG. 3. The cross section is cruciform shaped which tends to prevent excessive energy coupling between the energy sources and prevents the overheating of the edge of the processed foodstuff by concentrating microwave energy fields along the center of the tunnel cavity.

The oven shown by FIG. 1 consists of the above listed elements, including entrance and exit units 1 and 7 supporting the entrance and exit shields 2 and 2', microwave modules 3 cantilever supported, heat exchanger 4, airducts 5 and 6 and a continuous conveyor belt 9. This tunnel oven is used, for example, for thawing out fish blocks 10 carried through the cavity by the conveyor. In order to prevent overheating of their vertical edges, the fish blocks 10 are placed adjacent (abutting) each other to from a continuous chain. In accordance with one of the features of the invention, each block 10 is successively irradiated from the top and from the bottom of the tunnel, the microwave radiation coming through the wave guides 11 positioned above and below the conveyor belt 9 as shown by FIG. 2.

At the same time, very cold air between $-40°$ C. and $-20°$ C. is blown through duct 5 and is circulated through the tunnel along the blocks 10 and on through duct 6, to be reinjected in the tunnel by means of heat exchanger 4 and duct 5. As a result of the recycling, the energy required to maintain the circulated air at a constant low temperature is minimal.

The circulation of cold air through the tunnel improves, in a significant fashion, the temperature distribution throughout the fish block by the time it reaches the output end. This circulation prevents the phenomena of "locked in" localized heating in the areas of the block that thaw out first. It has been recognized by those familiar with microwave heating, that the closer foodstuff gets to its melting point, the more microwave energy it absorbs. Thus, it is possible to produce steam inside a block of ice, because water absorbs as much as a hundred times more energy than ice. In fact, edges, thin cross sections and the surface areas of foodstuff have a tendency to heat up faster and even to cook before the center portion is even thawed out. Hence, not only is overheating a nuisance, it is also a cause of energy loss. It wastes energy that could otherwise be used for the thawing out operation itself.

The feature of sequential and bi-directional microwave radiation injection into the tunnel cavity, combined in accordance with the invention, with the surface cooling of the foodstuff by the circulation of cold air, make it possible to maintain the outside surface of the product at a lower temperature than the inside, thus permitting better penetration by the microwave and getting a more even temperature distribution throughout the product. For example, it is possible to raise the temperature of pork front quarters from $-20°$ C. to $0°$ C., ($1°$ C. inside and $-1°$ to $-2°$ C.) at the surface without any edge heating or cooking.

The power requirements of a tunnel oven of the size for industrial food processing is high, for example it may be from 24 to 100 kW or more. These power levels can be obtained at the frequency of 915 MHz by grouping several microwave generators such as several magnetrons. This raises problems in launching (injecting) the microwave energy into the cavity, because of energy coupling from one magnetron to another. The coupling can cause the destruction of a magnetron. It is a feature of the present invention to use a large number of magnetrons, while at the same time minimizing the possibility of coupling, by using a group of modules which provide along the tunnel cavity an even number of microwave sources all of the same power level, with half of them located below the conveyor belt, and half above the belt in staggered relationships.

In those cases where it is possible to use single phase power supplies, (which is the case when the power does not exceed 5 to 7 kW), it becomes preferable that the number of generators per module be a multiple of three in order to balance out the phases. This allows for the connection of adjacent magnetrons to different phases, and so decreases even more the possibility of coupling. For example, such a module could contain six magnetrons having power levels of two, five or six kilowatts, each feeding a waveguide, such as 11, which is mounted above or below the module cavity, perpendicular to the cavity axis. Three such waveguides are mounted above and three are mounted below the module cavity as shown by FIG. 6. The relationship between power supply phases R, S and T for the magnetrons 13 that feed these waveguides are: along the bottom of the cavity, R, T and S; and along the top, S, R and T.

Referring particularly to FIG. 3, microwave energy is generated by magnetrons 13 and transmitted through waveguides 11 and through the two antennas 14 in each waveguide to the interior of the cruciform shaped tunnel cavity 12 which is made of stainless steel. The module door 20, which can be pivoted about the horizontal pivot 21, extends for the entire length of the module. While closed, the door insures thermal tightness by its non-conducting surface 22 and its insulation material 26. It also insures its tightness to radiation leakage through its metallic panel 23, its wave traps 24 and its absorbing gasket 25. The door opens over the entire length of the module, and there is no obstructing vertical member in the side of the module covered by the door. Hence, an oven tunnel made of several such modules, end to end, can be opened along the entire length of the tunnel; and when opened, it is possible to remove the conveyor belt and easily clean the tunnel. The tunnel 16 is located within the cruciform shaped microwave cavity, and is distinguished from the cavity, because it is transparent to microwaves. The tunnel may be of reinforced epoxy or polyproplene 16 that forms three walls of the transparent tunnel. The fourth wall is formed by the transparent surface 22 of the door.

Between and overlapping the doors of the adjacent modules are flaps 28, lined on their inside surface with a microwave absorbing substance 29. These flaps cover the joint between two adjacent modules doors to prevent microwave radiation leakage past the joint as well as air escape from within the oven.

Thermal insulation of the oven is made up of three panels 15, 17 and 18 made of cellular material, which has low microwave absorption characteristics. For example this material may be foamed polyurethane or polystyrene and is located within the microwave tunnel cavity, but attached respectively to the top, the bottom and the side of the cavity.

The bottom panel which supports the conveyor belt is made up of epoxy reinforced with glass fibers or other suitable material which is transparent to microwaves and is equipped with belt supports 27 that allow air circulation under the food to be processed.

Figure 7:
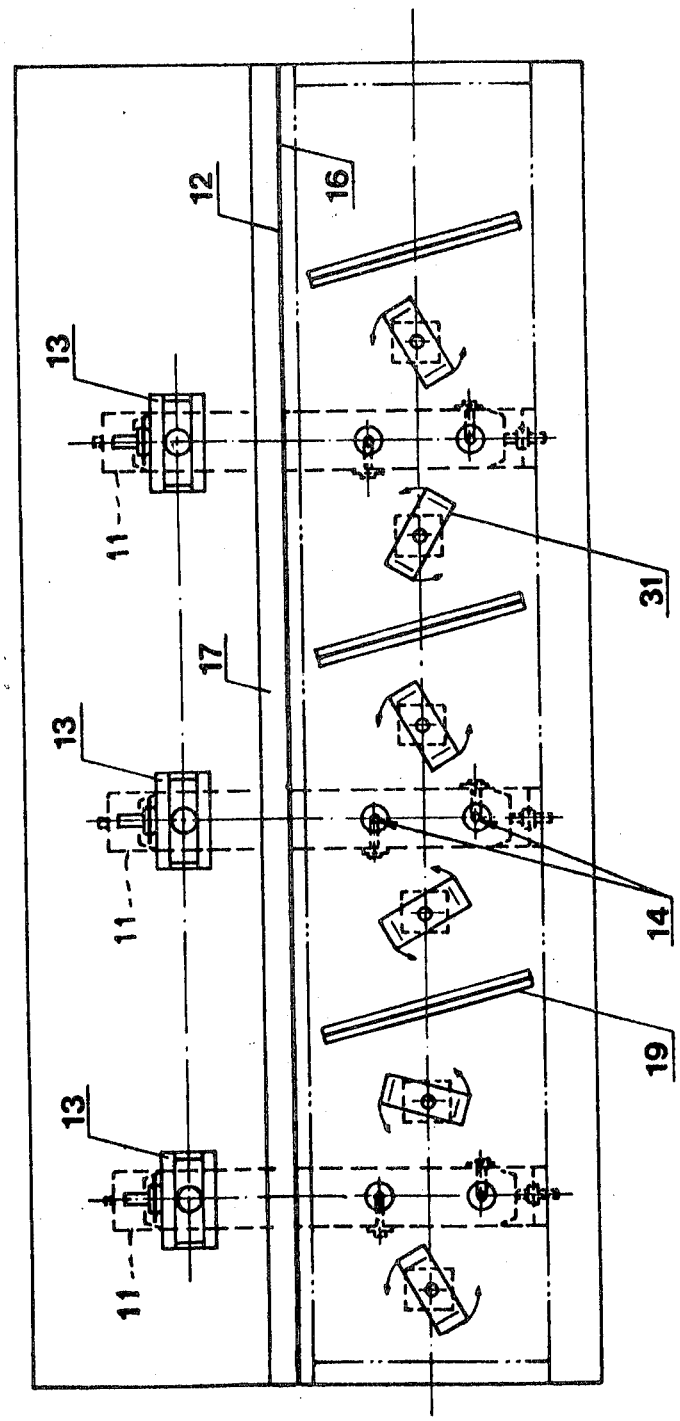
FIG. 7 is a horizontal cross section view CC through the extended length of the module, taken as shown in FIGS. 3 and 6.

A particular arrangement of magnetrons, waveguides and antennas launching microwave energy from the waveguides into the cavity of a module is shown by FIGS. 6 and 7. This arrangement provides distribution of the microwave energy within a six magnetron module. The arrangement performs without overheating of the blocks of foodstuff and does not permit coupling excessively between the magnetrons. FIG. 6 shows a vertical section through the module in the longitudinal plane and FIG. 7 shows a horizontal cross section of the six magnetron module. Magnetrons 13 are attached to the waveguides 11 (for example 11 has a cross section of 54×100 mm). The waveguides themselves are secured rigidly on the outside above and below the cruciform shaped cavity 12, as shown by these figures and also in FIG. 3. The waveguides 11 are mounted perpendicularly to the longitudinal axis of the microwave cavity 12, but they can also be positioned at an angle in relation to it.

The microwave energy injected through waveguides 11 by magnetron 13 is channelled through right angle antennas 14 (see FIGS. 5 and 7) and the energy is then transmitted by the antennas into the cruciform cavity 12 of each module. Clearly, other structures for coupling energy from the waveguide to the cavity could be used, for example crossbars or simple slots could be used.

Metallic reflectors 19 are mounted in the cavity to the wall 12 half-way between two rows of antennas 14 that project through the cavity wall. The reflector height is essentially similar to that of the upper and lower portion of the arms of the cruciform cross secion of the cavity and they are perpendicular to the top and bottom surfaces of cavity 12 and slightly at an angle with respect to the longitudinal axis. The microwaves emitted by antennas 14 and reflected by reflectors 19 are also mixed by the dynamic wave mixers 31 which are mounted along the longitudinal axis, at the bottom and top of the microwave cavity between the reflectors 19 and the rows of antennas 14. By this arrangement, coupling between magnetrons is sufficiently low to permit normal and continuous operation of the equipment.

The magnetrons are preferably energized with single phase power supplies. They are each connected in such a way that the magnetrons in the module energized by the same phase are located as far apart from each other as possible. Thus, along the module, the first magnetron is energized by phase R, the second one by phase S, the third one by phase T and so on as already mentioned.

The cruciform shape of the microwave tunnel has the objective of concentrating the radiation in the central portion of the tunnel along the center of the blocks 10 of foodstuff on the conveyor, thus preventing overheating of the edges 32 of the blocks. This is shown by figure 3. One reason for this is that the cruciform cross section of the cavity at 12' shields the edges of the blocks from direct radiation from the antenna (see FIG. 3). The shielding is particularly evident where the blocks of food stuff are large enough to substantially fill the cross section of the tunnel as shown by FIG. 3. In that case, the block edges 32 are clearly shielded by the inward projecting corners 12' of the cavity wall from direct radiation emanating from the nearby antenna 14. A satisfactory configuration of the cruciform shape is a rectangular cross section cavity of width W and height H stepped inwards at the corners to define the cruciform. The arms of the cross have a length equal to 1/6W to 1/5W and are ⅓H to ⅕H. Nevertheless, these proportions may vary. For example for a cavity having a cross section of W=500 mm by H=250 mm, the arms of the cross preferably have a length of 80 to 100 mm.

In order to clean the cavity easily and to enable the easy removal of the conveyor belt, the tunnel, and hence the modules are C-Shaped as viewed from the end. As already described, this tunnel can be opened over its entire length and has no vertical crossmembers over its entire length.

Figure 8:
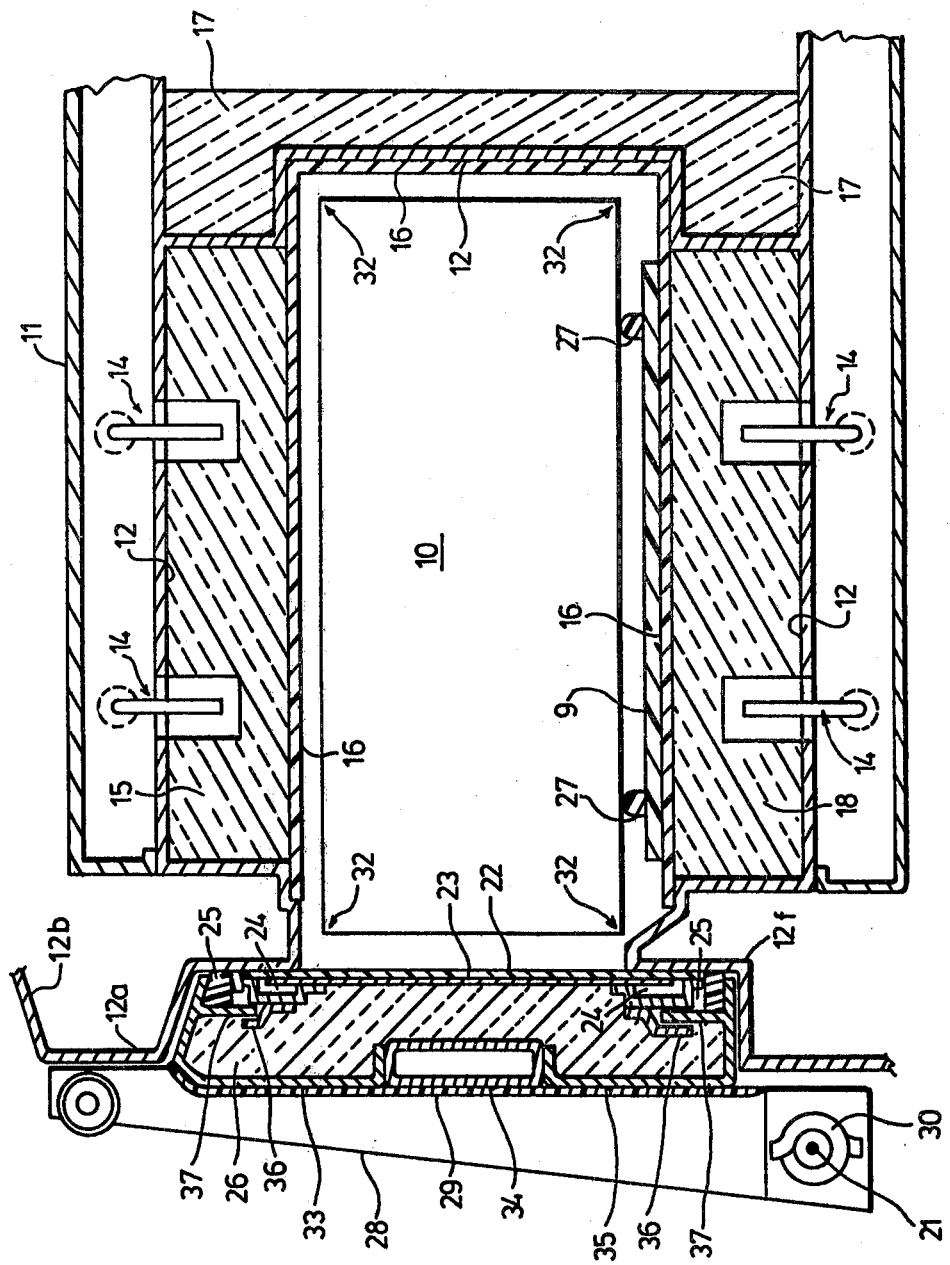
FIG. 8 is an enlarged cross section view of a door section which is shown also by FIG. 3.

The module construction of the entire cavity and tunnel and its extended length do not readily permit a single access door. Such a door would be too heavy to handle and the thermal stresses on the door, because of the temperature gradient within the cavity, (from −40° C. to +100° C.) would cause mechanical problems most difficult to solve. Accordingly, the tunnel is equipped with a single door for each module. FIG. 8 shows a cross section of such a door which incorporates the following:

(a) Thermal insulation—using panel 22 built of insulating plastic material such as epoxy and insulating foam 26 such as expanded polystyrene.

(b) Microwave seal—using wave traps of standard design which are integrated on the metallic support 23 along with absorbing gaskets 25. Metal support 23 together with the cruciform shaped walls 12 form the cavity section of each module. Wave traps 24 where 23 meets walls 12 are found only on the longitudinal sides of the door and they rest against the metallic envelope 32 of the microwave cavity. A space of a few millimeters width is left between each adjacent door to allow for thermal expansion.

(c) Mechanical freedom—is required as buckling due to thermal expansion could be a source of sizeable radiation leaks. Thus, the external part of the door is made up of three sections 33, 34 and 35. The central section 34, has a rectangular form to give it a transversal degree of freedom. On the other hand, the inner metal panel 23, on which the wave traps are mounted, remains free to expands longitudinally relative to sections 33 and 35, by the sliding mounts 36 attached to panel 23, that slides on rail 37 made up by the vertical folds of subpanels 33 and 35.

Both radiation and thermal tightness between two doors is insured by flap 28 which straddles symetrically across the door joint and covers the entire joint over a width of approximately 100 mm. The inside surface of the flap is covered with a substance 29 which absorbs microwaves. The flaps are mounted on hinges 21 which can also be common with the doors themselves. A powerful spring 30, mounted on flap 28, about hinge axis 21, compensates for a portion of the door weight and, thus eases considerably the opening of the doors.

The cruciform shaped microwave cavity wall 12 of adjacent modules, like modules 3, abut each other and, there is a gap between them to accomodate thermal expansion. These metal walls are insulated from the tunnel 16 contained within them, but the walls are heated by the heat generated in the oven, and so thermal expansion must be accommodated. The module outer walls at 12a, b, c, d, e and f, are not subject to significant temperature change during operation, and where these walls abut adjacent modules, a large thermal gap is not needed. Furthermore, there is very little microwave energy that escapes into the space between the cruciform shaped walls 12 that define the cavity and the outer wall 12a to f. However, if it is found desirable in some applications the juncture between walls 12a to f of abutting modules may be covered by a conductive strip to inhibit the escape of microwaves.

The embodiment of the present invention described hereinabove incorporates all of the features of the invention and represents the best known use of the invention. Clearly, some of these features could be omitted and other features substituted or some modifications of the features could be made without deviating from the spirit and scope of the invention as set forth by the appended claims.

What is claimed is:

1. A microwave oven comprising, (a) a microwave cavity of extended length having a top conductive wall, a bottom conductive wall, and side conductive walls, (b) said cavity walls being so connected that the fields of said microwave energy launched into the cavity are bounded by said walls, (c) the cross section of said cavity transverse to said extended length being of overall width W and height H and having a cruciform shape which is substantially uniform along said extended length and defines a central cavity axis, (d) an entrance shield at one end of said cavity that prevents the escape of microwave radiation energy from the cavity at said one end, (e) an exit shield at the other end of said cavity that prevents the escape of microwave radiation energy from the cavity at said other end, and (f) means for launching microwave energy into said cavity at places along the top wall or bottom wall such that the cruciform shape blocks some direct radiation from the launching places toward the intersections of side walls with the top or bottom wall, but does not block direct radiation toward the central portion of the cavity about the cavity axis, (g) whereby the intensity of the fields of said microwave energy within said cavity tends to be greater along said axis than along the intersection of said side walls with said top and bottom walls.

2. A microwave oven as in claim 1 wherein, (a) the microwave energy is launched into the cavity at a plurality of places along both the top and bottom walls such that the cruciform shape blocks some direct radiation from the launching places toward the intersections of the side walls with the top and bottom walls, but does not block direct radiation toward the central portion of the cavity about the cavity axis.

3. A microwave oven as in claim 1 wherein, (a) the length of the arms of the cruciform is sufficiently great that some direct radiation from the launching places toward the side walls is blocked.

4. A microwave oven as in claim 1 wherein, (a) W is greater than H.

5. A microwave oven as in claim 1 wherein, (a) the arms of said cruciform are of length between 1/6W and 1/5W.

6. A microwave oven as in claim 1 wherein, (a) H is between ⅓W and ½W.

7. A microwave oven as in claim 1 wherein, (a) the microwave energy is launched into the cavity at at least one place along the top wall and one place along the bottom wall and (b) said launching places are staggered with respect to each other along the cavity axis.

8. A microwave oven as in claim 7 wherein, (a) a plurality of magentrons, each with a power supply, are provided for generating the microwave energy, (b) the microwave energy is launched into the cavity from successive places along the top wall and bottom wall of the cavity, the microwave energy launched into each successive place being generated by different of said magnetrons and (c) the phases of the alternating current line power that drives the power supplies for said different magnetrons being different.

9. A microwave oven as in claim 8 wherein, (a) the same number of launching places are provided along the bottom as along the top of the cavity and
(b) the phases of the alternating current of line power that drives the power supplies for magnetrons generating power launched from adjacent places along the top and bottom being substantially different.

10. A microwave oven as in claim 9 wherein,
(a) the said line power phases driving power supplies for magnetrons are R, S and T,
(b) the power supply line power phases associated with successive launching places along the top wall are S, R and T, longitudinally therealong, in that order and along the bottom wall are R, T and S, longitudinally therealong, in that order from one end of the cavity to the other end.

* * * * *